April 9, 1968     R. C. ANTHONY     3,376,888
ADJUSTABLE MOUNTING PLATES FOR VALVES
Filed Oct. 24, 1965

INVENTOR
ROBERT C. ANTHONY
BY *Robert M. Dunning*
ATTORNEY

United States Patent Office 3,376,888
Patented Apr. 9, 1968

3,376,888
ADJUSTABLE MOUNTING PLATES FOR VALVES
Robert C. Anthony, St. Paul, Minn., assignor to Union Brass & Metal Mfg. Co., Ramsey County, Minn., a corporation of Minnesota
Filed Oct. 24, 1965, Ser. No. 504,711
1 Claim. (Cl. 137—359)

ABSTRACT OF THE DISCLOSURE

This invention relates to an adjustable mounting flange for wall mounted valves wherein a valve stem and externally threaded nipple protrudes from a wall surface. The adjustable flange includes a first flange member encircling the nipple and having a wall engaging end and a smaller diameter outer end. A multi-sided socket is provided in the outer end, and an internally extending flange is provided at the base of the socket having a cylindrical aperture therethrough. A second flange member has a tubular sleeve-like body of a diameter to fit through the internally extending flange. A peripheral multi-sided flange encircles the sleeve-like body and is spaced from the end of the sleeve-like body a distance substantially equal to the axial length of said internally extending flange. The first and second flange members may be angularly related without being obvious.

---

This invention relates to an improvement in adjustable cover plates for valves and deals particularly with a cover plate structure capable of concealing the stem of a valve assembly even though the amount to which the valve stem extends from the wall may vary within wide limits.

Valves of the type used for controlling the flow of water to showerheads and/or overrim spouts and the like, are usually concealed within the wall of the room. Only the stem of the valve assembly, and the threaded sleeve which usually encircles the valve stem necessarily projects completely through the wall. The extent to which the valve stems project from the wall varies both with the thickness of the wall and also with the location of the plumbing within the wall. It is an object of the present invention to provide a flange structure capable of concealing the valve stem regardless of the length of the projecting portion of the valve within wide limits.

A further feature of the present invention resides in the provision of an adjustable cover plate for valves of the type described, including a first flange member having an enlarged end designed to abut against the surface of the wall and a smaller outer end. A second flange member is substantially cylindrical in form, and is internally threaded substantially throughout its length for accommodating the externally threaded nipple projecting from the valve assembly and encircling the valve stem. The first flange member is provided with a multi-sided socket in its outer end, and the second flange member is provided with a multi-sided flange designed to engage in the socket. With this arrangement, it is possible to assemble the flange structure to the installed valve by placing the first flange member with its enlarged end abutting the wall surface in a manner such that the valve assemble nipple extends through or directly towards the aperture provided in the first flange member's outer end. The second flange member can then be selectively positioned to engage the threads provided in its interior with the threads provided on the exterior of the valve assemble nipple. The adjustment of the second flange member to its final position is accomplished by turning said second flange member with the fingers until its multi-sided flange tends to engage the matching multi-sided socket of the first flange member. The first flange member is then moved longitudinally so as to engage its multi-sided socket with the matching multi-sided flange of the second flange member and the first and second flange members as a unit are then twisted with the fingers or other suitable device, utilizing the enlarged end of the first flange member, until firm contact is accomplished between the wall surface and the enlarged end of the first flange member.

An added feature of the present invention resides in the provision of an adjustable cover plate which tends to hide imperfections in the mounting when the valve is not in right angular relation to the wall surface. The socket in the first flange member includes a multi-sided portion and an adjoining substantially cylindrical portion. The second flange member includes a matching multi-sided flange spaced at or slightly from the end extremity of the sleeve. When the flange structure is in place, the first flange member may be slightly out of axial alignment with the second flange member since the multi-sided flange will merely tilt to some extent in the matching multi-sided socket, but the two parts will remain in telescopic relation due to the construction thereof.

A further feature of the present invention resides in the provision of an adjustable flange structure for valves including a first flange designed to abut against the surface of the wall, and a second flange member which is substantially cylindrical and is threaded internally substantially throughout its length. By having the threads extend substantially through the entire length of the second flange member, a greater range of adjustment is provided than in structures where the threads extend only a portion of the length.

These and other objects and novel features of the present invention will be more clearly and fully set forth in the following specification and claim.

In the drawings forming a part of the specification:

Figures 1, 5:
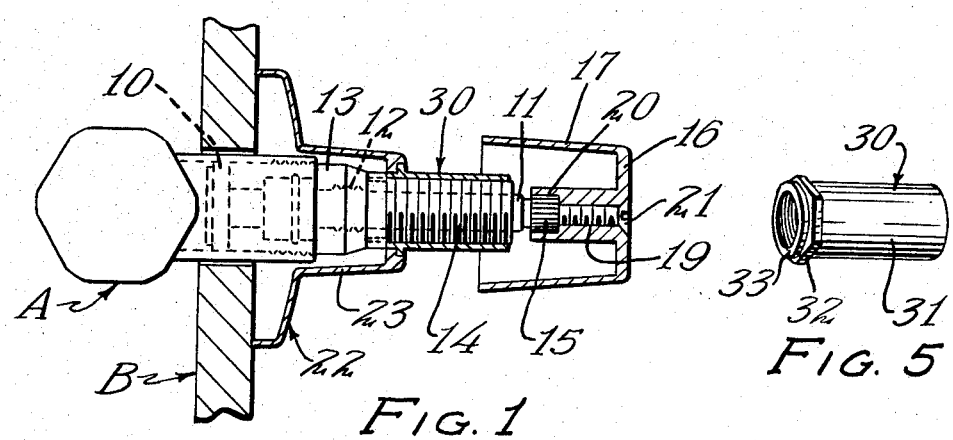
FIGURE 1 is a vertical sectional view through the cover flange parts and through a relatively thin wall.
FIGURE 5 is a perspective view of the second flange member. Illustrated is a multi-sided flange having six sides.

In view of the fact that the valve structure such as A is well known in the art, the details of construction are not illustrated. For the present purpose it is believed only necessary to indicate that the valve element A is normally mounted rearwardly of the wall B and includes an inlet and an outlet, not illustrated in the drawings, the flow between the inlet and outlet being controlled by a valve element 10. The valve element 10 is mounted on the end of the valve stem 11 having external threads 12 which are threaded into the valve element 13 and which serve to reciprocate the valve element 10 upon rotation of the valve stem 11.

The valve element 13 is equipped with a nipple 14 designed to encircle the valve stem 11. The end of the valve stem is longitudinally grooved or knurled as indicated at 15.

The handle 16 includes a peripheral skirt 17 directed toward the surface of the wall. The handle 16 is provided with an internal central boss 19 which is socketed axially at 20 to accommodate the knurled end 15 of the valve stem 11. A screw 21 extends axially through the boss 19 and is threaded into the knurled end 15 of the valve stem in order to hold the handle assembled.

The first flange member is indicated in general by the numeral 22. The flange member 22 includes a transition section 23 and 24 between the enlarged end 25 meant to abut the wall surface and a smaller outer end so constructed as to provide a multi-sided socket 26 and inwardly of socket 26 a flange 27 having a substantially cylindrical aperture 29 extending therethrough. The aperture 29 communicates with the hollow interior of the remainder of the mounting flange.

The second flange member 30 includes a hollow sleeve 31 substantially cylindrical in shape having a multi-sided flange 32 preferably but not necessarily spaced from the end thereof to provide a short projecting portion 33 in opposed relation to the body of the sleeve 31. The sleeve 31 is internally threaded substantially throughout its length.

The multi-sided flange 32 is designed to fit into the multi-sided socket 26, and either the body 31 of the second flange member or the opposed projecting portion 33 is designed to fit into the aperture 29 of the flange 27. Where the wall B is relatively thin, as in FIGURE 1 of the drawings, the second flange member 30 forms an extension of the transition section 23 of the first flange member 22, and conceals the nipple 14. It will be noted that the second flange member 30 is enclosed by the skirt 17 of the handle 16 even when the valve is used with an unusually thin wall B.

Figures 2, 4:
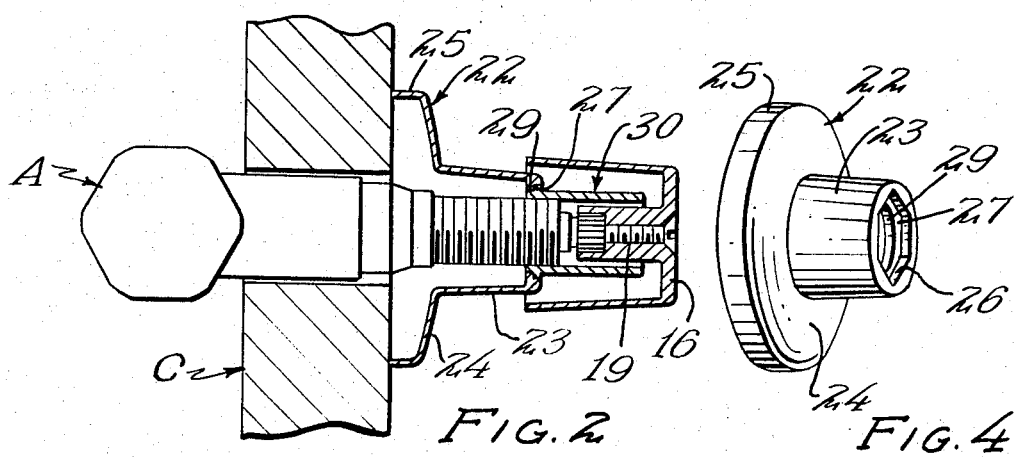
FIGURE 2 is a view similar to FIGURE 1 but showing the appearance of the cover flange parts when the thickness of the wall is increased.
FIGURE 4 is a perspective view of a first flange member. Illustrated is a multi-sided socket having six sides.

When used in conjunction with the thicker wall C, as in FIGURE 2 of the drawings, the second flange member 30 freely telescopes over the boss 19 of the handle 16. There is still enough room within the handle to permit the proper operation of the valve.

Figure 3:
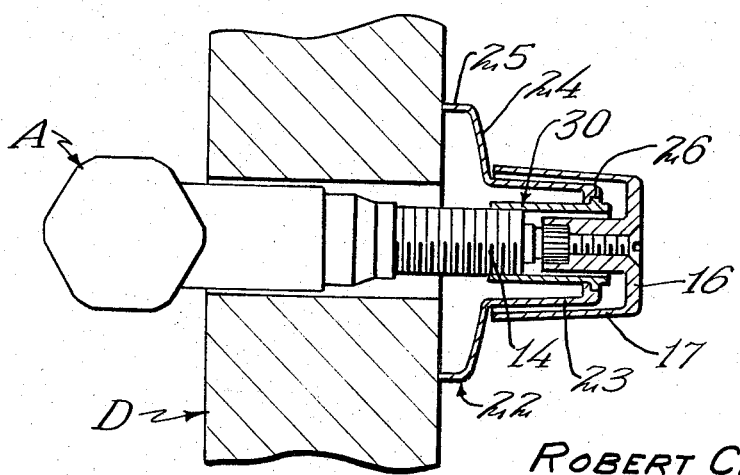
FIGURE 3 is a view similar to FIGURES 1 and 2 and showing the arrangement of the cover flange parts when used in conjunction with a wall of greater thickness.

When used with a still thicker wall D, as shown in FIGURE 3 of the drawings, the second flange member 30 is reversed in its position, the major portion of the length of the member 30 being enclosed within the transition section 23. Due to the fact that the second flange member 30 is threaded throughout its length, it is still supported upon the nipple 14 in the condition illustrated in this figure.

Due to the fact that the flange members are merely for concealing the valve stem and improving the appearance of the installation, it is not necesary to use tools to tighten the first flange member against the wall. However, the rotation of the second flange member 30 is greatly simplified by the engagement of the multi-sided flange 32 of the second flange member into the matching multi-sided socket 26 of the first flange member. This permits the rotation of the second flange member 30 by rotation of the first flange member 22. Due to the fact that the first flange member is of much greater dimension than the second, much greater twisting torque can be applied by the fingers.

The multi-sided form of the socket 26 and flange 32 is also of importance for a second reason. The second flange member 30 is always concentric with the valve stem 11 due to the fact that it is mounted upon the nipple 14. However, if the valve stem does not project at right angles from the surface of the wall, the first flange member 22 will tilt somewhat out of axial alignment with the second flange member. The multi-sided shape of the flange and socket have a tendency to conceal the fact that the two flange members are in angular relation. Furthermore, the two flange members always remain telescoped due to the engagement of the flange 32 and socket 26.

In accordance with the patent statutes, I have described the principles of construction and operation of my improvement in adjustable mounting plates for valves, and while I have endeavored to set forth the best embodiment thereof, I desire to have it understood that changes may be made within the scope of the following claim without departing from the spirit of my invention.

I claim:

1. An adjustable mounting flange for wall mounted valves wherein a valve stem and externally screw threaded nipple protrudes from a wall surface, and the valve is provided with a handle having a peripheral skirt directed toward the wall surface, said mounting flange comprising:

a first tubular flange member surrounding said valve stem and nipple, said first flange member having a wall engaging end, a transition section connected to said wall engaging end, and said transition section terminating in an end which is of relatively small diameter relative to said wall engaging end, said relatively small diameter end including a multi-sided socket, and an internally extending flange adjoining said socket and having a cylindrical aperture therethrough coaxial with said first flange member, a second flange member comprising a tubular cylindrical internally threaded sleeve-like body having a multi-sided flange extending peripherally thereabout spaced from an end of said body a distance substantially equal to the axial length of said internally extending flange, said sleeve-like body being of slightly smaller external diameter than the interior diameter of said aperture through said internally extending flange and said multi-sided flange engaging in said multi-sided socket, whereby said first and second flange members may be angularly related to the multi-sided flange engaging the multi-sided socket.

References Cited
UNITED STATES PATENTS

| | | | |
|---|---|---|---|
| 1,654,550 | 1/1928 | Muend | 137—359 |
| 1,790,316 | 1/1931 | Mueller | 137—359 XR |
| 1,857,136 | 5/1932 | Brown | 137—359 |
| 3,067,436 | 12/1962 | Freibott | 4—191 |

HENRY T. KLINKSIEK, *Primary Examiner.*